(12) United States Patent
Zhang et al.

(10) Patent No.: US 7,955,523 B2
(45) Date of Patent: Jun. 7, 2011

(54) LONG AFTERGLOW LUMINESCENT MATERIAL WITH COMPOUNDED SUBSTRATES AND ITS PREPARATION METHOD

(75) Inventors: Ming Zhang, Chengdu (CN); Li Zhang, Chengdu (CN); Xiaolei Zhang, Chengdu (CN); Qiang Zhang, Chengdu (CN)

(73) Assignee: Sichuan Sunfor Light Co., Ltd., Chengdu (CN)

( * ) Notice: Subject to any disclaimer, the term of this patent is extended or adjusted under 35 U.S.C. 154(b) by 732 days.

(21) Appl. No.: 11/993,574

(22) PCT Filed: Jun. 22, 2006

(86) PCT No.: PCT/CN2006/001428
§ 371 (c)(1),
(2), (4) Date: Jan. 2, 2008

(87) PCT Pub. No.: WO2007/003102
PCT Pub. Date: Jan. 11, 2007

(65) Prior Publication Data
US 2009/0014684 A1    Jan. 15, 2009

(30) Foreign Application Priority Data
Jul. 1, 2005   (CN) ............ 2005 1 0079900

(51) Int. Cl.
C09K 11/54 (2006.01)
C09K 11/55 (2006.01)
C09K 11/56 (2006.01)
C09K 11/59 (2006.01)
C09K 11/64 (2006.01)
C09K 11/70 (2006.01)
C09K 11/71 (2006.01)

(52) U.S. Cl. .... 252/301.4 R; 252/301.4 S; 252/301.4 F; 252/301.4 P; 252/301.6 R; 252/301.6 F; 252/301.6 P; 252/301.6 S

(58) Field of Classification Search ............ 252/301.4 P, 252/301.4 S, 301.4 F, 301.4 R, 301.6 R, 301.6 S, 252/301.6 P, 301.6 F
See application file for complete search history.

(56) References Cited

U.S. PATENT DOCUMENTS

| | | |
|---|---|---|
| 5,376,303 A | 12/1994 | Royce et al. |
| 5,424,006 A | 6/1995 | Murayama et al. |
| 5,859,496 A | 1/1999 | Murazaki et al. |
| 6,093,346 A | 7/2000 | Xiao et al. |
| 6,264,855 B1 | 7/2001 | Kitagawa et al. |
| 7,686,979 B2 * | 3/2010 | Luo et al. ............ 252/301.4 S |
| 2004/0164277 A1 | 8/2004 | Yen et al. |
| 2005/0158526 A1 | 7/2005 | Ino et al. |
| 2006/0273286 A1 | 12/2006 | Delespierre et al. |
| 2008/0116420 A1 | 5/2008 | Zhang et al. |

FOREIGN PATENT DOCUMENTS

| | | |
|---|---|---|
| CN | 1053807 A | 8/1991 |
| CN | 1307082 A | 8/2001 |
| CN | 1344777 A | 4/2002 |
| CN | 1443827 A | 9/2003 |
| JP | 8073845 A | 3/1996 |
| JP | 08127772 A | 5/1996 |
| JP | 08151573 A | 6/1996 |
| JP | 08151574 A | 6/1996 |
| JP | 200063825 A | 2/2000 |
| WO | 02083814 A1 | 10/2002 |

OTHER PUBLICATIONS

Supplementary European Search Report for EP 06761313.
International Search Report for PCT/CN2006/001428.

* cited by examiner

*Primary Examiner* — C. Melissa Koslow
(74) *Attorney, Agent, or Firm* — Caesar, Rivise, Bernstein, Cohen & Pokotilow, Ltd.

(57) ABSTRACT

The present invention provides a new ultra-long after-glow phosphorescent material and manufacturing method for the same. The materials include a phosphor including $aMS.bM_3(PO_4)_2.cMSiO_3.dMO.fAl_2O_3.xRO.yTR_2O_3.zMnO$, where the M is Ca, Mg, Ba, Sr, Zn or combinations thereof; The R is Eu, Sm, Yb or combinations thereof; the TR is La, Pr, Y, Nd, Dy, Er, Tm, Ce, Ho or combinations thereof: and a, b, c, d, f, x, y, z is the number of mol. The phosphorescent material has superior water resistance and temperature resistance.

12 Claims, No Drawings

LONG AFTERGLOW LUMINESCENT MATERIAL WITH COMPOUNDED SUBSTRATES AND ITS PREPARATION METHOD

FIELD OF INVENTION

The present invention relates to a composite long afterglow phosphorescent material as substrate and manufacturing method for the same, particularly to an ultra-long afterglow phosphorescent material with high water resistance and high brightness.

DESCRIPTION OF RELATED ART

The long after-glow phosphorescent material is a kind of material irradiated by sunlight or other light source, such as ZnS: Cu (green light emitting) or CaS: Bi (purple-blue light emitting) or ZnCdS: Cu (yellow-orange light emitting). This kind of sulfide with very short after-glow time, instable properties, poor photostability and short lifetime, however, should not be used outdoors basically. Even used for a clock panel, it cannot meet the needs due to only 20-30 minutes in afterglow time.

Another light-storage phosphor developed in the past contains a radioactive material, which can be self-luminous for a long time. But the radioactive material is an acknowledged dangerous pollution source. It will have serious damage for human body and environment. Therefore, it has already been prohibited to use internationally.

In the early 1990s, a long after-glow phosphorescent material excited by light was developed, for example, a long afterglow phosphorescent material with general formula $m(Sr_{1-x}Eu_x)O.nAl_2O_3.yB_2O_3$ has been disclosed in CN1053807A, which is not of enough brightness and after-glow time.

In addition, the $Eu^{2+}$-activated alkaline earth metal aluminate long after-glow phosphorescent material disclosed in the Patents U.S. Pat. No. 5,370,303 and U.S. Pat. No. 424,006, and Japanese Patents No. JP8-73845, JP8-127772 shows higher brightness and longer after-glow time, however, the sintering blocks are difficult to be broken, resulting in great depression of the powder brightness due to excessive high sintering temperature, or high sintering temperature reduced by introduced excessive boric acid. At the same time, because the $N_2+H_2$ gas mixture is used, the operational security is not good and equipment difficulty is increased. Also the requirement for heating becomes stricter due to excessive high sintering temperature, consequently the cost is increased.

In recent years, the luminescence property of the phosphorescent materials based on aluminate substrate has been continuously improved under people's unremitting efforts. But as described above, the problems, such as high temperature during its production process, high hardness of the product bulk, difficult to be broken have always perplexed people.

CN1307082A teaches a manufacturing method for a long after-glow inorganic luminescent material where a IIA, IIIA main group element oxide inorganic luminescent material co-activated by rare earth ion with the formula of $aMO.bN_2O_3.xRO.yTR_2O_3$ has been disclosed, wherein the M is one or more elements selected from Sr, Ca, Mg, Zn; the N is one or more elements from B, Al, Ga, Sc; the R is one or more elements selected from Eu, Sm, Yb; the TR is one or more elements from La, Pr, Y, Nd, Dy, Er, Tm, Ho, and $0.5 \leq a \leq 5, 0.5 \leq b \leq 7, 0.0001 \leq x \leq 0.5, 0.0001 \leq y \leq 0.5$. The said method is provided by filling $NH_3$ or adding carbon granules into the comminuted oxalates, carbonates or hydroxides corresponding oxide and the 0.1-1% (weight) sulfur based on the total materials, and being sintered at 1200-1400° C. for 2-5 hours. The obtained materials can be further processed by sodium silicate or potassium silicate, or by methyl silicone. The inorganic luminescent material with above mentioned general formula prepared by the above method has the characteristic of rapid excitation in faint light. Due to relatively low calcining temperature, the obtained material is easy to be comminuted to obtain the luminescent powder with fine granules, and has good water resistance to meet the needs of water paint substantially. However, the fluorescence brightness and water resistance of the obtained product still can not meet the needs for long-term storage. In light of above disadvantages, the present invention satisfies that the water paint will not change its luminescence property for a long-time storage. Therefore, the present invention aims to provide an ultra-long after-glow phosphorescent material with stability in water for a longer time and higher fluorescence brightness.

BRIEF SUMMARY OF THE INVENTION

In a first aspect, the present invention comprises an ultra-long after-glow phosphorescent material, comprising a phosphor depicted by the formula

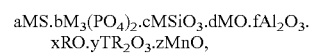

$aMS.bM_3(PO_4)_2.cMSiO_3.dMO.fAl_2O_3.xRO.yTR_2O_3.zMnO$, wherein
the M is at least one of Ca, Mg, Ba, Sr, Zn; the R is at least one of Eu, Sm and Yb; the TR is at least one of La, Y, Nd, Dy, Er, Tm, Ce, Ho; and a, b, c, d, f, x, y, z is the
 $0.01 \leq a \leq 8$, preferably $0.01 \leq a \leq 5$;
 $0.01 \leq b \leq 6$, preferably $0.01 \leq b \leq 1.5$;
 $0.01 \leq c \leq 2$, preferably $0.01 \leq c \leq 1$;
 $0.01 \leq d \leq 7$, preferably $0.01 \leq d \leq 5$;
 $0.01 \leq f \leq 7$, preferably $0.01 \leq f \leq 5$;
 $0.0001 \leq x \leq 0.5$, preferably $0.0001 \leq x \leq 0.01$;
 $0.0001 \leq y \leq 0.5$, preferably $0.001 \leq y \leq 0.01$;
 $0.001 \leq z \leq 0.2$, preferably $0.001 \leq z \leq 0.01$.

In a second aspect, the present invention comprises a manufacturing method for the ultra-long after-glow phosphorescent material of the invention, comprising the following steps:
 1) using oxides, carbonates, oxalates, nitrates or hydroxides of the M as raw material of the M; sulfur as raw material of the S; phosphorus pentoxide ($P_2O_5$) or ammonium dihydrogen phosphate ($NH_4H_2PO_4$) as raw material of the phosphor; silicon dioxide as raw material of the silicon; alumina or aluminum hydroxide as a raw material of the alumina; Oxides of R as the raw material of RO; Oxides of the elements corresponding to TR as the raw material of the $TR_2O_3$; the weight ratio of these raw materials satisfying the above relation of the a, b, c, d, f, x, y, z; and also urea, the molar ratio of urea to M is 0.1-1:1; LiCl, the molar ratio of LiCl to M is 0.0165-1:1;
 2) Mixing the above raw materials thoroughly, filling $NH_3$ or adding carbon granules into the mixture, calcining at 1200-1450° C. for 1-4 hours.

In a third aspect, the present invention comprises an article, comprising the above mentioned ultra-long after-glow phosphorescent materials. Preferably, the said article is a kind of ceramic material, which can be obtained by calcining the ultra-long after-glow phosphorescent materials and ceramic raw material together at 500-1000° C.

Specifically, the manufacturing method for the said ultra-long after-glow phosphorescent material comprises mixing the above mentioned oxide, hydroxide or nitrate, sulfur (refined sulfur or sublimated sulfur) with urea added at the same thoroughly for 8-12 hours, then calcining at 1200-1450° C. for 1-4 hours in reductive conditions such as $2NH_3 \rightarrow N_2+3H_2$ or C (carbon).

The phosphorescent material sintered body with loose blocks can be obtained by cooling the sintered phosphorescent material in air. The phosphorescent material powder with uniform particle size (fineness can attain nanometer scale) can be obtained by the jaw crusher, crush roller, jet mill, ultrasonic vibrating screen. Then the surface of the obtained product is further processed by the surface coated treatment with the 0.1-2% concentration (weight) of ethyl orthosilicate or methyl silicone oil whereby the high brightness, ultra-long after-glow in the present invention and luminescent powders with uniform particle size and excellent water resistance can be obtained.

Compared with the conventional methods, the luminescent material in accordance with the present invention is of loose blocks, easy to be comminuted and the obtained product has a uniform particle size. In addition, the product has the good property excited by faint light, high luminescence brightness and after-glow lasted for a long time. Moreover, the product in the present invention is of good water resistance and has strong practicality.

The ultra-long after-glow phosphorescent material in the present invention is a composite substrate inorganic luminescent material with superior luminescent property to that of the phosphorescent material based on aluminate substrate. This phosphorescent material has polyhedron crystal lattice and can be excited quickly under faint light (1-3 seconds). In addition, the obtained composite long after-glow phosphorescent material as substrate with a very small particle size (such as nanometer scale) still has high brightness, ultra-long after-glow properties. And also such material has excellent water resistance property. In addition, the ultra-long after-glow multi substrate phosphorescent material in present invention also has good heat resistance, which can be combined with ceramic materials and calcified at 500-1000° C. to produce a luminescent ceramic article with insusceptible luminescence brightness.

DETAILED DESCRIPTION OF PREFERRED EMBODIMENTS OF THE INVENTION

The invention will be illustrated in more detail with reference to the following Examples, but it should be understood that the present invention is not deemed to be limited thereto.

In the following examples, specifications of the used reagents are priority purity, and S is refined sulfur.

Example 1

Raw Materials:

| raw material | dosage (g) | dosage (mol) | raw material | dosage (Kg) | dosage (mol) |
|---|---|---|---|---|---|
| $SrCO_3$ | 57.8 Kg | 0.3915 | $Al_2O_3$ | 37.6 Kg | 0.5013 |
| $Eu_2O_3$ | 2.8 Kg | 0.008 | $Dy_2O_3$ | 3.1 Kg | 0.0083 |
| $H_3BO_3$ | 3.7 Kg | 0.0599 | S | 1.7 Kg | 0.05431 |
| $P_2O_5$ | 6.4 Kg | 0.0451 | LiCl | 0.7 Kg | 0.0163 |
| Urea | 0.5 Kg | 0.0083 | $Ce_2O_3$ | 0.7 Kg | 0.0021 |
| $MnCO_3$ | 0.5 Kg | 0.0044 | $SiO_2$ | 12 Kg | 0.1997 |

Method:

Materials with above ratio are mixed thoroughly, then put in a corundum crucible and introduced into $NH_3$ gas at 1450° C., and then calcined for 1.5 hours in this environment. Then, the obtained materials are ground to the size of 10-50 um by the jet mill to obtain the luminescent powder. The general formula of the product generally is:

$$0.05431\ SrS.0.027\ Sr_3(PO_4)_2.0.1997\ SrSiO_3.0.3915\ SrO.0.5013\ Al_2O_3.0.008\ EuO.0.0083\ Dy_2O_3.0.0021\ Ce_2O_3.0.0044\ MnO \quad (1)$$

The obtained luminescent powders are put into the solution with ethyl orthosilicate:ethanol=100:2, stirred thoroughly and dried at 200° C., sieved to obtain phosphorescent material with excellent water resistance, high initial-brightness and long-time after-glow. The obtained product with the emission peak 530 nm is yellow-green illuminant. When excited by 200 LX light source, the time that the brightness is reduced to 0.32 mcd/m² is 70 h. Main properties compared with the known products are listed in Table 1.

Example 2

Raw Materials:

| raw material | dosage (g) | dosage (mol) | raw material | dosage (Kg) | dosage (mol) |
|---|---|---|---|---|---|
| $SrCO_3$ | 56.2 | 0.3807 | $Al_2O_3$ | 32 | 0.3137 |
| $Eu_2O_3$ | 2.2 | 0.00625 | $Dy_2O_3$ | 2.7 | 0.00723 |
| $H_3BO_3$ | 3.2 | 0.0517 | S | 3.2 | 0.1 |
| $P_2O_5$ | 5 | 0.0352 | LiCl | 0.4 | 0.0094 |
| Urea | 0.2 | 0.003 | $Ce_2O_3$ | 0.5 | 0.00152 |
| $MnCO_3$ | 0.6 | 0.00174 | $SiO_2$ | 9 | 0.149 |

Method:

The method in the example 1 is repeated except that the calcination is performed at 1400° C. for two hours. The general formula of thus obtained luminescent powder generally is:

$$0.1\ SrS.0.0176\ Sr_3(PO_4)_2.0.149\ SrSiO_3.0.3807\ SrO.0.3137\ Al_2O_3.0.0625\ EuO.0.00723\ Dy_2O_3.0.00152\ Ce_2O_3.0.00174\ MnO \quad (2)$$

The further process with ethyl orthosilicate:ethanol=100:2 in the same manner as Example 1 is performed.

The obtained product with the emission peak 530 nm is yellow-green illuminant. When excited by 200 LX light source, the time that the brightness is reduced to 0.32 mcd/m² is 66 h. Main properties compared with the known products are listed in Table 1.

Example 3

Raw Materials:

| raw material | dosage (g) | dosage (mol) | raw material | dosage (Kg) | dosage (mol) |
|---|---|---|---|---|---|
| $SrCO_3$ | 57.5 | 0.3895 | $Al_2O_3$ | 37 | 0.3627 |
| $Eu_2O_3$ | 1.98 | 0.0056 | $Dy_2O_3$ | 2.65 | 0.0071 |
| $H_3BO_3$ | 4 | 0.0647 | S | 14 | 0.4375 |
| $P_2O_5$ | 8 | 0.05635 | LiCl | 0.35 | 0.00825 |
| Urea | 0.5 | 0.008 | $Ce_2O_3$ | 0.5 | 0.001513 |
| $MnCO_3$ | 0.6 | 0.00522 | $SiO_2$ | 7 | 0.1165 |

Method:

The method in the Example 1 is repeated except that the calcination is performed at 1400° C. for three hours. The general formula of the obtained luminescent powder generally is:

$$0.4375\ SrS.0.02817\ Sr_3(PO_4)_2.0.0582\ SrSiO_3.0.3895\ SrO.0.3627\ Al_2O_3.0.0056\ EuO.0.0071\ Dy_2O_3.0.001513\ Ce_2O_3.0.00522\ MnO \qquad (3)$$

The further process with ethyl orthosilicate:ethanol=100:2 in the same manner as Example 1 is performed.

The obtained product with the emission peak 530 nm is yellow-green illuminant. When excited by 200 LX light source, the time that the brightness is reduced to 0.32 mcd/m² is 65 h. Main properties compared with the known products list in Table 1.

Example 4

Raw Materials:

| raw material | dosage (g) | dosage (mol) | raw material | dosage (Kg) | dosage (mol) |
|---|---|---|---|---|---|
| SrCO_3 | 34 | 0.233 | Al_2O_3 | 58.5 | 0.5735 |
| Eu_2O_3 | 1.44 | 0.00409 | Dy_2O_3 | 3.1 | 0.00831 |
| H_3BO_3 | 3.7 | 0.5986 | S | 1.7 | 0.053 |
| P_2O_5 | 6.4 | 0.045 | LiCl | 0.7 | 0.0165 |
| Urea | 0.5 | 0.008 | Ce_2O_3 | 0.7 | 0.00213 |
| MnCO_3 | 0.5 | 0.00435 | SiO_2 | 12 | 0.2 |

Method:

The method in the Example 1 is repeated except that the calcination is performed at 1450° C. for 3 h. The general formula of the obtained luminescent powder generally is:

$$0.053\ SrS.0.0275\ Sr_3(PO_4)_2.0.2\ SrSiO_3.0.233\ SrO.0.5735\ Al_2O_3.0.004\ EuO.0.00873\ Dy_2O_3.0.00435\ MnO \qquad (4)$$

The further process with ethyl orthosilicate:ethanol=100:2 in the same manner as Example 1 is performed.

The obtained product is blue illuminant. When excited by 200 LX light source, the time that the brightness is reduced to 0.32 mcd/m² is 70 h. Main properties compared with the known products are listed in Table 1.

Example 5

Raw Materials:

| raw material | dosage (g) | dosage (mol) | raw material | dosage (Kg) | dosage (mol) |
|---|---|---|---|---|---|
| SrCO_3 | 24 | 0.1625 | Al_2O_3 | 53.7 | 0.5264 |
| Eu_2O_3 | 1.8 | 0.0051 | Dy_2O_3 | 2.7 | 0.00723 |
| H_3BO_3 | 3.2 | 0.05177 | S | 3.2 | 0.1 |
| P_2O_5 | 5 | 0.0352 | LiCl | 0.4 | 0.0094 |
| Urea | 0.2 | 0.0033 | Ce_2O_3 | 0.5 | 0.00435 |
| MnCO_3 | 0.6 | 0.00522 | SiO_2 | 6 | 0.1 |

Method:
The method in the Example 1 is repeated except that calcination is at 1400° C. for three hours. The general formula of the obtained luminescent powder basically is:

$$0.1625\ SrS.0.0176\ Sr_3(PO_4)_2.0.1\ SrSiO_3.0.1625\ SrO.0.5264\ Al_2O_3.0.0051\ EuO.0.00723\ Dy_2O_3.0.00435\ Ce_2O_3.0.6\ MnO \qquad (5)$$

The further process with ethyl orthosilicate:ethanol=100:2 in the same manner as Example 1 is performed.

The obtained product is the blue illuminant. When excited by 200 LX light source, the time that the brightness is reduced to 0.32 mcd/m² is 66 h. Main properties compared with the known products are listed in Table 1.

Example 6

Raw Materials:

| raw material | dosage (g) | dosage (mol) | raw material | dosage (Kg) | dosage (mol) |
|---|---|---|---|---|---|
| SrCO_3 | 33 | 0.2235 | Al_2O_3 | 59 | 0.5784 |
| Eu_2O_3 | 1.68 | 0.005317 | Dy_2O_3 | 2.65 | 0.0071 |
| H_3BO_3 | 4 | 0.0647 | S | 9 | 0.281 |
| P_2O_5 | 8 | 0.0564 | LiCl | 0.35 | 0.00825 |
| Urea | 0.5 | 0.00833 | Ce_2O_3 | 0.5 | 0.00435 |
| MnCO_3 | 0.6 | 0.00423 | SiO_2 | 7 | 0.1167 |

Method:

The method in the Example 1 is repeated except that calcination is at 1400° C. for 3 h. The general formula of the obtained luminescent powder generally is:

$$0.281\ SrS.0.0282\ Sr_3(PO_4)_2.0.1167\ SrSiO_3.0.1235\ SrO.0.5784\ Al_2O_3.0.005317\ EuO.\ 0.0071\ Dy_{2pk\ O3}.0.1167\ Ce_2O_3.0.6\ MnO \qquad (6)$$

The further process with ethyl orthosilicate:ethanol=100:2 in the same manner as Example 1 is performed.

The obtained product with the emission peak 530 nm is yellow-green illuminant. When excited by 200 LX light source, the time that the brightness is reduced to 0.32 mcd/m² is 65 h. Main properties compared with the known products are listed in Table 1.

Example 7

Raw Materials:

| raw material | dosage (g) | dosage (mol) | raw material | dosage (Kg) | dosage (mol) |
|---|---|---|---|---|---|
| CaCO_3 | 33 | 0.33 | Al_2O_3 | 59 | 0.5784 |
| Pr_6O_{11} | 1.68 | 0.00165 | Dy_2O_3 | 2.65 | 0.0071 |
| H_3BO_3 | 4 | 0.0647 | S | 9 | 0.281 |
| P_2O_5 | 8 | 0.0564 | LiCl | 0.35 | 0.00825 |
| Urea | 0.5 | 0.00833 | Ce_2O_3 | 0.5 | 0.00435 |
| MnCO_3 | 0.6 | 0.00423 | SiO_2 | 7 | 0.1167 |

Method:

The method in the Example 1 is repeated except that the calcination is performed at 1400° C. for 3 h. The general formula of the obtained luminescent powder generally is:

$$0.281\ CaS.0.0286\ Ca_3(PO_4)_2.0.1167\ CaSiO_3.0.33\ CaO.0.5764\ Al_2O_3.0.00165\ Pr_2O_3.0.0071\ Dy_2O_3.0.1157\ Ce_2O_3.0.6\ MnO \qquad (7)$$

The further process with ethyl orthosilicate:ethanol=100:2 in the same manner as Example 1 is performed.

The obtained product is purple illuminant. When excited by 200 LX light source, the time that the brightness is reduced to 0.32 mcd/m² is 65 h. Main properties compared with the known products are listed in Table 1.

Example 8

Raw Materials:

| raw material | dosage (g) | dosage (mol) | raw material | dosage (Kg) | dosage (mol) |
|---|---|---|---|---|---|
| $MgCO_3$ | 37 | 0.4404 | $Al_2O_3$ | 59 | 0.5784 |
| $Nd_2O_3$ | 1.68 | 0.00291 | $Dy_2O_3$ | 2.65 | 0.0071 |
| $H_3BO_3$ | 4 | 0.0647 | S | 9 | 0.281 |
| $P_2O_5$ | 8 | 0.0564 | LiCl | 0.35 | 0.00825 |
| Urea | 0.5 | 0.00833 | $Ce_2O_3$ | 0.5 | 0.00435 |
| $MnCO_3$ | 0.6 | 0.00423 | $SiO_2$ | 7 | 0.1167 |

Method:

The method in the Example 1 is repeated except that the calcination is performed at 1400° C. for 3 h. The general formula of the obtained luminescent powder generally is:

$$0.281\ MgS \cdot 0.0282\ Mg_3(PO_4)_2 \cdot 0.1167\ MgSiO_3 \cdot 0.4404\ MgO \cdot 0.5784\ Al_2O_3 \cdot 0.00291\ Nd_2O_3 \cdot 0.0071\ Dy_2O_3 \cdot 0.1167\ Ce_2O_3 \cdot 0.6\ MnO \quad (8)$$

The further process with ethyl orthosilicate:ethanol=100:2 in the same manner as Example 1 is performed.

The obtained product is the glaucous illuminant. When excited by 200 LX light source, the time that the brightness is reduced to 0.32 mcd/m² is 65 h. Main properties compared with the known products are listed in Table 1.

Example 9

Raw Materials:

| raw material | dosage (g) | dosage (mol) | raw material | dosage (Kg) | dosage (mol) |
|---|---|---|---|---|---|
| $BaCO_3$ | 36.5 | 0.2235 | $Al_2O_3$ | 59 | 0.5784 |
| $Eu_2O_3$ | 1.68 | 0.005317 | $Tm_2O_3$ | 2.65 | 0.0071 |
| $H_3BO_3$ | 4 | 0.0647 | S | 9 | 0.281 |
| $P_2O_5$ | 8 | 0.0564 | LiCl | 0.35 | 0.00825 |
| Urea | 0.5 | 0.00833 | $Ce_2O_3$ | 0.5 | 0.00435 |
| $MnCO_3$ | 0.6 | 0.00423 | $SiO_2$ | 7 | 0.1167 |

Method:

The method in the Example 1 is repeated except that the calcination is performed at 1400° C. for 3 h. The general formula of the obtained luminescent powder generally is:

$$0.281\ BaS \cdot 0.0282\ Ba_3(PO_4)_2 \cdot 0.1167\ BaSiO_3 \cdot 0.2235\ BaO \cdot 0.5784\ Al_2O_3 \cdot 0.005317\ EuO \cdot 0.0071\ Tm_2O_3 \cdot 0.1167\ Ce_2O_3 \cdot 0.6\ MnO \quad (9)$$

The further process with ethyl orthosilicate:ethanol=100:2 in the same manner as Example 1 is performed.

The obtained product with the emission peak 530 nm is green illuminant. When excited by 200 LX light source, the time that the brightness is reduced to 0.32 mcd/m² is 65 h. Main properties compared with the known products are listed in Table 1.

TABLE 1

| Product | Luminescence Brightness (unit) | Luminescence time (hour) | pH in water | Granularity D50 (μm) |
|---|---|---|---|---|
| Example 1 | 170 | 70 | 7-8(stable) | 10-13 |
| Example 2 | 150 | 66 | 7-8(stable) | 10-13 |
| Example 3 | | 65 | | |
| Example 4 | 140 | 70 | 7-8(stable) | 10-13 |
| Example 5 | | 66 | | |
| Example 6 | | 65 | | |
| Example 7 | | 65 | | |
| Example 8 | | 65 | | |
| Example 9 | | 65 | | |
| Product in CN1307082A (example) | 120-150 | 55-65 | 7-8(stable) | 10-13 |
| $SrAl_2O_4$:$Eu^{2+}Dy^{3+}$ | 100 | 48 | 13.5 (decomposed in one hour) | >30 |

Evidently, compared with the existing product, the luminescence brightness and the luminescence time of the product in the present invention have been substantially improved. With regard to the water stability, the product in present invention can be effectively combined with water paints, printing inks, etc., after processed by high molecular material. The application area is widened.

Example 10

Table 2 shows the heat-resistant property when the product, from the present invention and CN1307082A, is combined with ceramic glaze. From Table 2, it can be seen that in the past inventions, when combined with ceramic glaze, due to the product properties of the luminescent materials, the luminescence property is reduced with the increase of the temperature owing to the poor temperature resistance when firing ceramics. While the luminescent ceramic products produced by the ceramic glaze in combination with the luminescence material produced in present invention has superior thermal stability, with little effect on the luminescent property by temperature.

TABLE 2

| | | Temperature ° C. | | | | | | |
|---|---|---|---|---|---|---|---|---|
| | | 500 | 700 | 800 | 900 | 1000 | 1100 | 1200 |
| lower rate of luminescence property | Present invention | 2% | 5% | 12% | 17% | 22% | 30% | 50% |
| | CN 1307082A | 2% | 5% | 17% | 27% | 40% | 60% | 80% |

The invention claimed is:

1. An ultra-long after-glow phosphorescent material, comprising a phosphor depicted by the formula $aMS \cdot bM_3(PO_4)_2 \cdot cMSiO_3 \cdot dMO \cdot fAl_2O_3 \cdot xRO \cdot yTR_2O_3 \cdot zMnO$;

where M is at least one of Ca, Mg, Ba, Sr, Zn;
R is at least one of Eu, Sm and Yb;
TR is at least one of La, Y, Nd, Dy, Er, Tm, Ce, and Ho;
and each of a, b, c, d, f, x, y, z is a number of moles, wherein:
$0.01 \leq a \leq 8$;
$0.01 \leq b \leq 6$;
$0.01 \leq c \leq 2$;
$0.01 \leq d \leq 7$;
$0.01 \leq f \leq 7$;
$0.0001 \leq x \leq 0.5$;
$0.0001 \leq y \leq 0.5$; and
$0.001 \leq z \leq 0.2$.

2. The ultra-long after-glow phosphorescent material as claimed in claim 1, wherein the said a, b, c, d, f, x, y, z respectively are:
$0.01 \leq a \leq 5$;
$0.01 \leq b \leq 1.5$;
$0.01 \leq c \leq 1$;
$0.01 \leq d \leq 5$;
$0.01 \leq f \leq 5$;
$0.0001 \leq x \leq 0.01$;
$0.001 \leq y \leq 0.01$;
$0.001 \leq z \leq 0.1$.

3. The ultra-long after-glow phosphorescent material as claimed in claim 1, wherein the said ultra-long after-glow phosphorescent material is:

$0.05431SrS \cdot 0.027 \, Sr_3(PO_4)_2 \cdot 0.1997 \, SrSiO_3 \cdot 0.3915SrO \cdot 0.5013Al_2O_3 \cdot 0.008EuO \cdot 0.0083Dy_2O_3 \cdot 0.0021Ce_2O_3 \cdot 0.0044MnO$;

$0.1SrS \cdot 0.0176Sr_3(PO_4)_2 \cdot 0.149 \, SrSiO_3 \cdot 0.3807SrO \cdot 0.3137Al_2O_3 \cdot 0.0625EuO \cdot 0.00723Dy_2O_3 \cdot 0.00152Ce_2O_3 \cdot 0.00174MnO$;

$0.4375SrS \cdot 0.02817Sr_3(PO_4)_2 \cdot 0.0582 \, SrSiO_3 \cdot 0.3895SrO \cdot 0.3627Al_2O_3 \cdot 0.0056EuO \cdot 0.0071Dy_2O_3 \cdot 0.001513Ce_2O_3 \cdot 0.00522MnO$;

$0.053SrS \cdot 0.0275Sr_3(PO_4)_2 \cdot 0.2 \, SrSiO_3 \cdot 0.233SrO \cdot 0.5735Al_2O_3 \cdot 0.004EuO \cdot 0.00873Dy_2O_3 \cdot .00217Ce_2O_3 \cdot 0.00435MnO$;

$0.1625SrS \cdot 0.0176Sr_3(PO_4)_2 \cdot 0.1 \, SrSiO_3 \cdot 0.1625SrO \cdot 0.5264Al_2O_3 \cdot 0.0051EuO \cdot 0.00723Dy_2O_3 \cdot 0.00435Ce_2O_3 \cdot 0.6MnO$;

$0.281SrS \cdot 0.0282Sr_3(PO_4)_2 \cdot 0.1167 \, SrSiO_3 \cdot 0.1235SrO \cdot 0.5784Al_2O_3 \cdot 0.005317EuO \cdot 0.0071Dy_2O_3 \cdot 0.1167Ce_2O_3 \cdot 0.6MnO$; or $0.281BaS \cdot 0.0282Ba_3(PO_4)_2 \cdot 0.1167 \, BaSiO_3 \cdot 0.2235BaO \cdot 0.5784Al_2O_3 \cdot 0.005317EuO \cdot 0.0071Tm_2O_3 \cdot 0.1167Ce_2O_3 \cdot 0.6MnO$.

4. A method for manufacturing an ultra-long after-glow phosphorescent material, the phosphorescent material comprising a phosphor depicted by $aMS \cdot bM_3(PO_4)_2 \cdot cMSiO_3 \cdot dMO \cdot fAl_2O_3 \cdot xRO \cdot yTR_2O_3 \cdot zMnO$, where,
M is at least one of Ca, Mg, Ba, Sr, Zn;
R is at least one of Eu, Sm and Yb;
TR is at least one of La, Y, Nd, Dy, Er, Tu, Ce, Ho;
and each of a, b, c, d, f, x, y, z is a number of moles, wherein:
$0.01 \leq a \leq 8$;
$0.01 \leq b \leq 6$;
$0.01 \leq c \leq 2$;
$0.01 \leq d \leq 7$;
$0.01 \leq f \leq 7$;
$0.0001 \leq x \leq 0.5$;
$0.0001 \leq y \leq 0.5$;
$0.001 \leq z \leq 0.2$;
wherein the method comprises the following steps:
1) using oxides, carbonates, oxalates, nitrates or hydroxides of M as a raw material of M; sulfur as a raw material of S; phosphorus pentoxide ($P_2O_5$) or ammonium dihydrogen phosphate ($NH_4H_2PO_4$) as a raw material of phosphorus; silicon dioxide as a raw material of silicon; alumina or aluminum hydroxide as a raw material of alumina; Oxides of R as a raw material of RO; Oxides of elements corresponding to TR as a raw material of $TR_2O_3$;
provided that weight ratios of these raw materials satisfy the above relation of a, b, c, d, f, x, y, and z; and also using urea at a molar ratio of urea to M of 0.1-1:1 and LiCl at a molar ratio of LiCl to M of 0.0165-1:1;
2) Mixing the above raw materials thoroughly, filling $NH_3$ or adding carbon granules into the mixture, and calcining at 1200-1450° C. for 1-4 h to provide the ultra-long after-glow phosphorescent material.

5. The method as claimed in claim 4, wherein the said a, b, c, d, f, x, y, z respectively are:
$0.01 \leq a \leq 5$;
$0.01 \leq b \leq 1.5$;
$0.01 \leq c \leq 1$;
$0.01 \leq d \leq 5$;
$0.01 \leq f \leq 5$;
$0.001 \leq x \leq 0.0$;
$0.001 \leq y \leq 0.01$;
$0.001 \leq z \leq 0.1$.

6. The method as claimed in claim 4, wherein the said ultra-long after-glow phosphorescent material is $0.05431SrS \cdot 0.027 \, Sr_3(PO_4)_2 \cdot 0.1997 \, SrSiO_3 \cdot 0.3915SrO \cdot 0.5013Al_2O_3 \cdot 0.008EuO \cdot 0.0083Dy_2O_3 \cdot 0.0021Ce_2O_3 \cdot 0.0044MnO$;

$0.1SrS \cdot 0.0176Sr_3(PO_4)_2 \cdot 0.149 \, SrSiO_3 \cdot 0.3807SrO \cdot 0.3137Al_2O_3 \cdot 0.0625EuO \cdot 0.00723Dy_2O_3 \cdot 0.00152Ce_2O_3 \cdot 0.00174MnO$;

$0.4375SrS \cdot 0.02817Sr_3(PO_4)_2 \cdot 0.0582 \, SrSiO_3 \cdot 0.3895SrO \cdot 0.3627Al_2O_3 \cdot 0.0056EuO \cdot 0.0071Dy_2O_3 \cdot 0.001513Ce_2O_3 \cdot 0.00522MnO$;

$0.053SrS \cdot 0.0275Sr_3(PO_4)_2 \cdot 0.2 \, SrSiO_3 \cdot 0.233SrO \cdot 0.5735Al_2O_3 \cdot 0.004EuO \cdot 0.00873Dy_2O_3 \cdot 0.00217Ce_2O_3 \cdot 0.00435MnO$;

$0.1625SrS \cdot 0.0176Sr_3(PO_4)_2 \cdot 0.1 \, SrSiO_3 \cdot 0.1625SrO \cdot 0.5264Al_2O_3 \cdot 0.0051EuO \cdot 0.00723Dy_2O_3 \cdot 0.00435Ce_2O_3 \cdot 0.6MnO$;

$0.281SrS \cdot 0.0282Sr_3(PO_4)_2 \cdot 0.1167 \, SrSiO_3 \cdot 0.1235SrO \cdot 0.5784Al_2O_3 \cdot 0.005317EuO \cdot 0.0071Dy_2O_3 \cdot 0.1167Ce_2O_3 \cdot 0.6MnO$; or $0.281BaS \cdot 0.0282Ba_3(PO_4)_2 \cdot 0.1167 \, BaSiO_3 \cdot 0.2235BaO \cdot 0.5784Al_2O_3 \cdot 0.005317EuO \cdot 0.0071Tm_2O_3 \cdot 0.1167Ce_2O_3 \cdot 0.6MnO$.

7. The method as claimed in claim 4, further comprising a step of comminuting the obtained ultra-long after-glow phosphorescent material by calcination and treating the material with ethyl orthosilicate or methyl silicone oil solution of 0.1-2% concentration (by weight).

8. The method as claimed in claim 7, wherein the ultra-long after-glow phosphorescent material is comminuted to nanometer scale.

9. An article, comprising the ultra-long after-glow phosphorescent material as claimed in claim 1.

10. The article as claimed in claim 9, wherein the said article is ceramic and is prepared by calcining the said ultra-long after-glow phosphorescent material with ceramic raw materials together at 500-1000° C.

11. The article as claimed in claim 9, wherein the said a, b, c, d, f, x, y, z respectively are:
$0.01 \leq a \leq 5$;
$0.01 \leq b \leq 1.5$;
$0.01 \leq c \leq 1$;
$0.01 \leq d \leq 5$;
$0.01 \leq f \leq 5$;
$0.0001 \leq x \leq 0.01$;
$0.001 \leq y \leq 0.01$;
$0.001 \leq z \leq 0.1$.

12. The article as claimed in claim 9, wherein the said ultra-long after-glow phosphorescent material is:

$0.05431SrS.0.027 Sr_3(PO_4)_2.0.1997 SrSiO_3.0.3915SrO.0.5013Al_2O_3. 0.008EuO.0.0083Dy_2O_3.0.0021Ce_2O_3.0.0044MnO$;

$0.1SrS.0.0176Sr_3(PO_4)_2.0.149SrSiO_3. 0.3807SrO.0.3137Al_2O_3.0.0625EuO. 0.00723Dy_2O_3.0.00152Ce_2O_3.0.00174MnO$;

$0.4375SrS.0.02817Sr_3(PO_4)_2.0.0582SrSiO_3. 0.3895SrO.0.3627Al_2O_3.0.0056EuO. 0.0071Dy_2O_3. 0.001513Ce_2O_3.0.00522MnO$;

$0.053SrS.0.0275Sr_3(PO_4)_2.0.2SrSiO_3.0.233SrO. 0.5735Al_2O_3.0.004EuO.0.00873Dy_2O_3.0.00217Ce_2O_3. 0.00435MnO$;

$0.1625SrS.0.0176Sr_3(PO_4)_2.0.1SrSiO_3.0.1625SrO. 0.5264Al_2O_3.0.0051EuO.0.00723Dy_2O_3.0.00435Ce_2O_3. 0.6MnO$;

$0.281SrS.0.0282Sr_3(PO_4)_2.0.1167SrSiO_3.0.1235SrO. 0.5784Al_2O_3.0.005317EuO.0.0071Dy_2O_3.0.1167Ce_2O_3. 0.6MnO$; or $0.281BaS.0.0282Ba_3(PO_4)_2.0.1167BaSiO_3. 0.2235BaO.0.5784Al_2O_3.0.005317EuO. 0.0071Tm_2O_3.0.1167Ce_2O_3.0.6MnO$.

* * * * *